(12) United States Patent
Onoda et al.

(10) Patent No.: US 8,474,049 B2
(45) Date of Patent: Jun. 25, 2013

(54) VERIFICATION METHOD, INFORMATION PROCESSING DEVICE, RECORDING MEDIUM, VERIFICATION SYSTEM, CERTIFICATION PROGRAM, AND VERIFICATION PROGRAM

(75) Inventors: Senichi Onoda, Osaka (JP); Masaya Yamamoto, Arcadia, CA (US); Toshihisa Nakano, Osaka (JP); Kaoru Murase, Nara (JP); Masayuki Kozuka, Osaka (JP); Takashi Yamanishi, Tokyo (JP); Yoshitomo Osawa, Kanagawa (JP); Tateo Oishi, Saitama (JP); Jun Yonemitsu, Kanagawa (JP); Katsumi Muramatsu, Tokyo (JP)

(73) Assignees: Panasonic Corporation, Osaka (JP); Sony Corporation, Tokyo (JP)

( * ) Notice: Subject to any disclaimer, the term of this patent is extended or adjusted under 35 U.S.C. 154(b) by 1219 days.

(21) Appl. No.: 11/661,425

(22) PCT Filed: Jun. 27, 2006

(86) PCT No.: PCT/JP2006/312797
§ 371 (c)(1),
(2), (4) Date: Feb. 6, 2008

(87) PCT Pub. No.: WO2007/000993
PCT Pub. Date: Jan. 4, 2007

(65) Prior Publication Data
US 2008/0256639 A1 Oct. 16, 2008

Related U.S. Application Data

(60) Provisional application No. 60/694,258, filed on Jun. 28, 2005.

(51) Int. Cl.
*H04L 29/06* (2006.01)

(52) U.S. Cl.
USPC .................. 726/26; 726/2; 713/150; 713/189

(58) Field of Classification Search
USPC ...................................... 726/26; 713/159, 193
See application file for complete search history.

(56) References Cited

U.S. PATENT DOCUMENTS

| 6,526,041 B1 | 2/2003 | Shaffer et al. |
| 7,370,233 B1 * | 5/2008 | Sobel et al. ..................... 714/15 |

(Continued)

FOREIGN PATENT DOCUMENTS

| CN | 1464688 | 12/2003 |
| JP | 10-254840 | 9/1998 |

(Continued)

OTHER PUBLICATIONS

Self-Protecting Digital Content; Cryptography Research, Inc.; Kocher et al; 2004 1-12 pages.*

(Continued)

*Primary Examiner* — Taghi Arani
*Assistant Examiner* — Jason Lee
(74) *Attorney, Agent, or Firm* — Wenderoth, Lind & Ponack, L.L.P.

(57) ABSTRACT

A virtual machine can be implemented by anyone because the interface and other information necessary for implementation are publicly available. Hence, if virtual machine is implemented maliciously, a program operating thereon can be made to operate maliciously instead of operating legitimately. By comparing secret information held in memory and specific to the virtual machine with verification information which a program holds itself, the program verifies that the virtual machine on which it is running has been legitimately implemented and excludes illegitimate virtual machines.

7 Claims, 6 Drawing Sheets

U.S. PATENT DOCUMENTS

| | | | |
|---|---|---|---|
| 8,281,362 B2 * | 10/2012 | Nagata et al. | 726/2 |
| 2004/0240440 A1 | 12/2004 | Wild et al. | |
| 2005/0033972 A1 | 2/2005 | Watson | |
| 2005/0204126 A1 * | 9/2005 | Watson | 713/150 |
| 2006/0005034 A1 | 1/2006 | Willman et al. | |
| 2007/0033419 A1 * | 2/2007 | Kocher et al. | 713/193 |

FOREIGN PATENT DOCUMENTS

| | | |
|---|---|---|
| JP | 2000-295354 | 10/2000 |
| JP | 2002-182768 | 6/2002 |
| JP | 2005-128997 | 5/2005 |
| JP | 2005-244695 | 9/2005 |
| JP | 2006-18825 | 1/2006 |
| WO | 2005/096121 | 10/2005 |

OTHER PUBLICATIONS

"A Security mechanism of Mobile Agents against Attack of Malicious Hosts" *Information Processing Society of Japan*, 63rd National Convention, pp. 549-550, 2001 second stage (including partial English translation).

Shen, X. et al., Security policies for mobile agent based on role-based access control, *Computer Engineering and Design*, vol. 26, No. 2 (Feb. 2005), pp. 329-331.

Shen, X. et al., Security policies for mobile agent based on role-based access control, *Computer Engineering and Design*, vol. 26, No. 2 (Feb. 2005), pp. 329-330.

* cited by examiner

| ADDRESS (401) | VALUE (402) |
|---|---|
| 0x00ff0000 | 0x00 |
| 0x00ff0001 | 0xff |
| 0x00ff0002 | 0x04 |
| 0x00ff0003 | 0x04 |
| 0x00ff0004 | 0x26 |
| 0x00ff0005 | 0x25 |
| 0x00ff0006 | 0x80 |
| 0x00ff0007 | 0x71 |
| 0x00ff0008 | 0x15 |
| 0x00ff0009 | 0x21 |
| 0x00ff000a | 0x91 |
| 0x00ff000b | 0x12 |
| 0x00ff000c | 0x12 |

FIG.5

| VERIFICATION VALUE TABLE IDENTIFICATION INFORMATION (117) | VERIFICATION ORDER (501) | ADDRESS (401) | VERIFICATION VALUE (502) |
|---|---|---|---|
| 0x0011ff0000011001 | 1 | 0x00ff0001 | 0xed |
| | 2 | 0x00ff0005 | 0x36 |
| | 3 | 0x00ff0002 | 0x15 |
| | 4 | 0x00ff0007 | 0x67 |
| | 5 | 0x00ff0004 | 0x34 |
| 0x0022ee0000050003 | 1 | 0x00ee0010 | 0x1234 |
| | 2 | 0x00ee004a | 0x5678 |
| | 3 | 0x00ee0076 | 0xabcd |
| ⋮ | | | |

FIG.6

| VERIFICATION VALUE TABLE IDENTIFICATION INFORMATION (117) | ADDRESS (401) | VERIFICATION VALUE (502) |
|---|---|---|
| 0x0011ff0000011001 | 0x00ff0001 | 0xed |
| | 0x00ff0002 | 0x16 |
| | 0x00ff0004 | 0x34 |
| | 0x00ff0005 | 0x37 |
| | 0x00ff0007 | 0x63 |
| 0x0022ee0000050003 | 0x00ee0010 | 0x4321 |
| | 0x00ee004a | 0x8765 |
| | 0x00ee0076 | 0xdcba |
| ⋮ | | |

US 8,474,049 B2

VERIFICATION METHOD, INFORMATION PROCESSING DEVICE, RECORDING MEDIUM, VERIFICATION SYSTEM, CERTIFICATION PROGRAM, AND VERIFICATION PROGRAM

This application is a U.S. National Stage application of International Application No. PCT/JP2006/312797, filed Jun. 27, 2006, which is claiming benefit of U.S. Provisional Application Ser. No. 60/694,258, filed Jun. 28, 2005.

TECHNICAL FIELD

The present invention relates to an apparatus that uses a virtual machine to execute programs, and in particular to a technique for judging legitimacy of a platform on which the virtual machine is implemented, and rejecting the platform if it is not legitimate.

BACKGROUND ART

In recent years, virtual machines have come to be used for running programs without depending on platforms such as the OS and the CPU. A virtual machine is generally implemented by software, and since the interface and other information necessary to implement the virtual machine is publicly available, the virtual machine can be implemented by anyone.

Patent Document 1: Japanese Laid-open Patent Application Publication 2005-244695

SUMMARY OF THE INVENTION

Problem to be Solved by the Invention

For this reason, by implementing a virtual machine maliciously, a program that operates thereon can be made to operate maliciously rather than legitimately. If the program is, for example, one that protects the copyright of contents such as a movie, this can lead to the contents being played without authorization.

In view of the aforementioned problem, the present invention has an object of providing a verification method, an information processing apparatus, a recording medium, a verification system, a certification program and a verification program that enable a program to verify that a virtual machine that is running the program is implemented legitimately.

Means for Solving the Problem

In order to solve the program, the present invention provides a verification method used in an information processing apparatus that executes processing relating to playback of contents by using a virtual machine included therein, the verification method comprising: a reading step of reading a verification program recorded on a recording medium together with the contents; and a verification step of verifying, by using the virtual machine executing the verification program, legitimacy of the information processing apparatus including the virtual machine.

Advantageous Effect of the Present Invention

With the stated structure, the verification program executed on the virtual machine can verify the legitimacy of the information processing apparatus including virtual machine.

In the verification step, certification information that varies depending on timing may be used for the verification.

With the stated structure, since the certification information varies depending on timing, an unauthorized third party has to analyze a program implementing the verification method in detail and follow the operations of the program in order to obtain the certification information. Accordingly, it is very difficult to obtain the certification information. Therefore, compared with the case where the legitimacy is certified using static data such as a certification and identification number, it is difficult to disguise as a legitimate virtual machine. This is an advantageous effect of the present invention.

The verification step may include a requesting step of making a request for the certification information that is based on secret information stored in the information processing apparatus, a comparing step of comparing the certification information with verification information recorded on the recording medium, and a judging step of judging whether the information processing apparatus is legitimate based on a result of the comparison, and the verification method may further comprise a providing step of generating the certification information by using the virtual machine on reception of the request, and providing the verification program with the generated certification information.

Advantageous Effects of the Invention

With the stated structure, the verification of the legitimacy is performed using the certification information generated by the virtual machine. Since only the legitimate virtual machine can generate the legitimate certification information, it is possible to surely verify the legitimacy of the virtual machine included in the information processing apparatus.

The judging step may include a repeating step of repeating the comparing step every time the certification information varies depending on timing, and a concluding step of concluding that the information processing apparatus is illegitimate if comparisons of the comparing step repeated by the repeating step have resulted in failure a prescribed number of times in succession.

With the stated structure, the information processing apparatus including the virtual machine is judged as legitimate only when the verification information coincides with the certification information a prescribed number of times in succession. Therefore, even if one piece of the verification information is known to an unauthorized third party in some way, the verification information can not be judged as legitimate by the verification.

The providing step may include an update step of changing calculation information used for generating the certification information, based on a value specific to a reading order of the secret information.

With the stated structure, the calculation information is updated in the update step. In other words, the data used for generating the certification information also varies every time the certification information is generated. Therefore, the present invention has an advantageous effect that it is difficult for the third party to make a prediction on the legitimate certification information.

The recording medium may have recorded thereon a plurality of verification candidate information sets, the information processing apparatus may store therein one or more secret information sets, the verification step may include a selection step of selecting one of the verification candidate information sets as verification information, a requesting step of making a request for the certification information generated based on one of the secret information sets corresponding to the verification information, a comparing step of comparing the certification information with the verification information, and a judging step of judging whether the information processing apparatus is legitimate based on a result of the comparison, and the verification method may further comprise a providing step of generating, on reception of the request, by using the virtual machine, the certification information based on the secret information set corresponding to the verification information, and providing the verification program with the generated certification information.

The judging step may include a repeating step of repeating the selection step, the requesting step and the comparing step if the certification information and the verification information are judged as being identical in the comparing step, and a concluding step of concluding that the information processing apparatus is legitimate if the certification information and the verification information are judged as being identical a prescribed number of times in succession in the comparisons of the comparing step repeated by the repeating step, and concluding that the information processing apparatus is illegitimate in another case.

With the stated structure, in the repetition the information processing apparatus is judged as legitimate only when the verification information coincides with the certification information a prescribed number of times in succession. Therefore, it is possible to more surely detect an illegitimate information processing apparatus and restrain use of contents by an illegitimate information processing apparatus.

In the repeated verification steps, verification candidate information set among the verification information sets that is to be selected as verification information in the selection step of every repetition of the verification step is different according to the number of repetitions of the verification step, and in the providing step, the certification information to be generated may vary according to the number of repetitions of the verification step.

With the stated structure, the selection step selects a different certification information set in every repetition. Therefore, the present invention has an advantageous effect that it is difficult for the third party to make a prediction on the legitimate certification information to be used for the comparison.

In the selection step, one of the verification candidate information sets may be randomly selected, and in the comparing step, the comparison may be performed using the certification information that randomly varies and is in correspondence with the one of the verification candidate information sets.

With the stated structure, the selection step randomly selects the certification information. Therefore, the present invention has an advantageous effect that it is difficult for the third party to make a prediction on the legitimate certification information to be used for the comparison.

One or more of the verification candidate information sets may correspond to an identifier uniquely identifying the virtual machine, and in the selection step, one of the one or more of the verification candidate information sets corresponding to the identifier may be selected as the verification information.

With the stated structure, the verification program recorded on the recording medium can verify legitimacy of a plurality of information processing apparatuses having different secret information sets.

The recording medium may have recorded thereon a playback-related program that is executed on the virtual machine and includes processing procedure relating to playback of the contents, and the verification method may further comprise a restraining step of restraining execution of the processing procedure relating to playback of the contents if the information processing apparatus is judged as illegitimate in the verification step.

With the stated structure, if the information processing apparatus including the virtual machine is judged as illegitimate, the processing procedure relating to playback of the contents is restrained in the restraining step. Therefore, the verification method according to the present invention has an advantageous effect that playback of the contents performed by an information processing apparatus including a maliciously implemented virtual machine can be restrained.

EXPLANATION OF REFERENCES

101 Information processing apparatus
102 Recording medium
111 Disk reading unit
112 User operation reception unit
113 Virtual machine execution unit
114 Information storage unit
115 Virtual machine execution code
116 Verification value table
117 Verification value table identification information
121 Virtual machine code
1151 Verification value obtaining module
1152 Verification value conversion module
1153 State holding module
1154 Virtual machine code execution module
1121 Virtual machine verification module
1122 Verification information module
1123 Code dependency processing module
401 Address
402 Value
501 Verification order
502 Verification value

DETAILED DESCRIPTION OF THE INVENTION

The following describes a preferred embodiment of the present invention with reference to the drawings.

Figure 1:
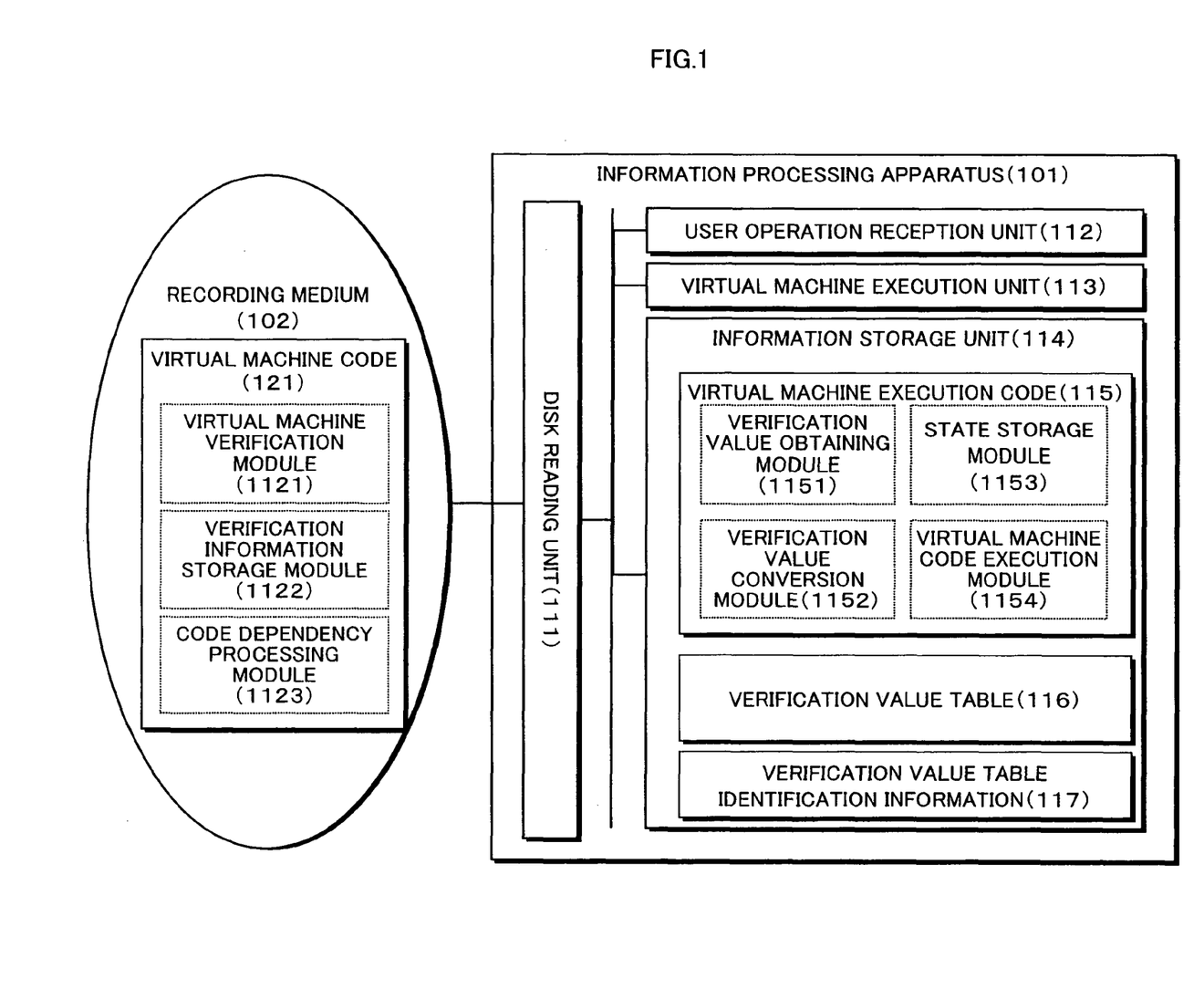
FIG. 1 shows the structure of a recording medium 102 and an information processing apparatus 101.

The following describes a recording medium and an information processing apparatus of one embodiment of the present invention with use of FIG. 1.

Virtual machine code 121, which is a program that operates on a virtual machine, is recorded on a recording medium 102. One implementation example of the recording medium 102 is a BD (Blu-Ray Disc), although the recording medium 102 is not limited to this. Furthermore, the virtual machine code 121 is composed of a virtual machine verification module 1121, a verification information storage module 1122, and a code dependency processing module 1123. The modules are described in detail later.

An information processing apparatus 101 is an apparatus that executes the virtual machine code 121 using a virtual machine, and, as shown in FIG. 1, is composed of a disk reading unit 111, a user operation reception unit 112, a virtual machine execution unit 113, and an information storage unit 114. A virtual machine is software that executes a program that is implemented as the virtual machine code 121 by converting it into native code of a platform, in order to have the program operate without depending on a platform such as a CPU or an OS. As one specific example, the virtual machine is a Java virtual machine and the virtual machine code 121 is Java byte code, but they are not limited to being so.

One example of a method for implementing the information processing apparatus 101 is a computer system composed of a CPU, a work memory, a flash memory, a BD drive, and a remote controller. Here, the disk reading unit 111 is the BD (Blu-ray Disc) drive, the information storage unit 114 is the flash memory, the user operation reception unit 112 is the remote controller, and the virtual machine execution unit 113 is software that operates using the CPU and the work memory. However, the virtual machine execution unit 113 is not limited to being structured by software, and may be implemented in hardware or the like.

Furthermore, the information storage unit 114 stores a virtual machine execution code 115, a verification value table 116, and verification value table identification information 117. The virtual machine execution code 115 is software, and is composed of a verification value obtaining module 1151, a verification value conversion module 1152, a state storage module 1153, and a virtual machine code execution module 1154. The modules are described in detail later.

Figure 4:
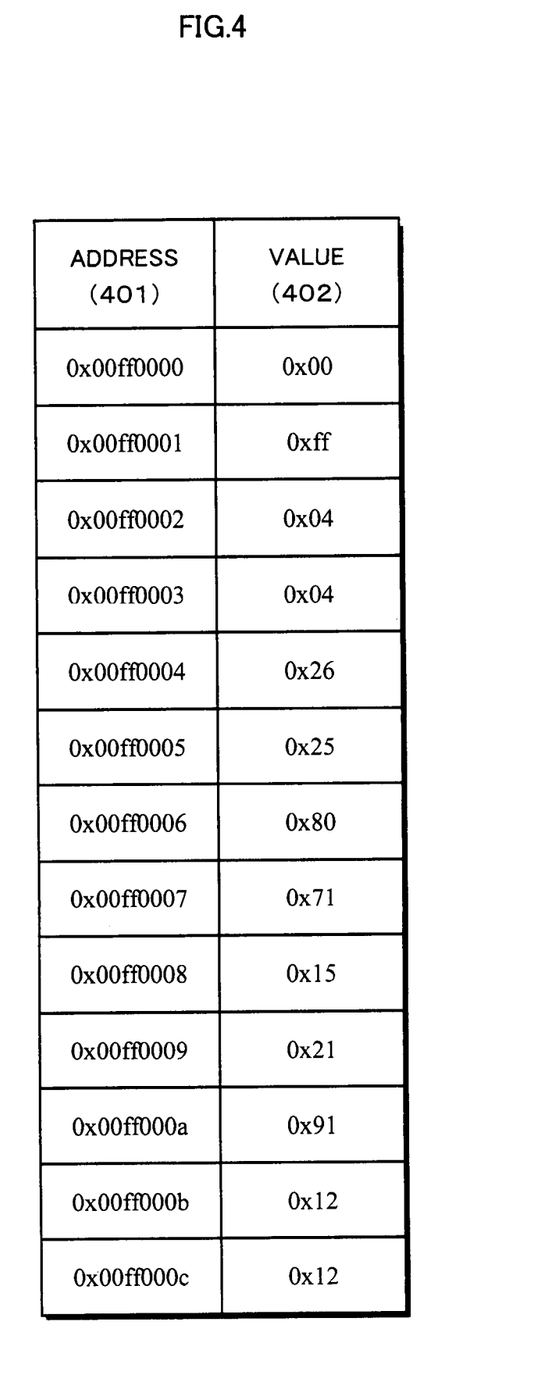
FIG. 4 is an example of the data structure of a verification value table 116.

The verification value table 116 is a memory table that stores values relating to the execution environment of information processing apparatuses, and stores values that the virtual machine code 121 uses for verifying the legitimacy of the execution environment that includes the virtual machine. As an example the verification value table 116 is binary data and the like of firmware such as described below and is unique to the information processing apparatus 101. Hence, each information processing apparatus has data of differing values. FIG. 4 shows a specific data structure. The verification value table 116 is composed of addresses 401 and values 402. The verification value table 116 shows that, for example, the value corresponding to an address 0x00ff0000 is 0x00. Furthermore, it is not necessary for the values in the verification value table 116 to be fixed. All or part of the verification value table 116 may be dynamically changed during execution of processing as long as a fixed value can be returned at the point in time at which a verification value is requested.

The verification value table identification information 117 is information for identifying the verification value table 116, and is, for example, 8-byte data composed of "information processing apparatus manufacturer ID+information processing apparatus model number+verification value table version number". However, the verification value table identification information 117 is not limited to this composition, and any information that uniquely identifies the verification value table 116 may be used.

The following describes creation of the verification information. The provider of the legitimate virtual machine execution code 115 provides the virtual machine verification value table 116 and the verification value table identification information 117 to a virtual machine management organization. The virtual machine management organization provides the verification value table 116 and the verification value table identification information 117 of the legitimate virtual machine to the implementer of the virtual machine code, based on which the implementer of the verification machine code creates verification information.

Note that while the assumption in the present embodiment is that the recording medium 102 is a BD, and the virtual machine code 121 recorded thereon is read into the information processing apparatus 101 by the disk reading unit 111, the present invention is not limited to such a method. Other methods may be used for reading the virtual machine code 121 into the information processing apparatus 101, an example of which being one where the disk reading unit 111 is replaced with an Internet connection unit, and the virtual machine code 121 is read into the information processing apparatus 101 via the Internet.

This completes the description of the recording medium and the information processing apparatus pertaining to an embodiment of the present invention.

(Execution of the Virtual Machine Code)

Figure 2:
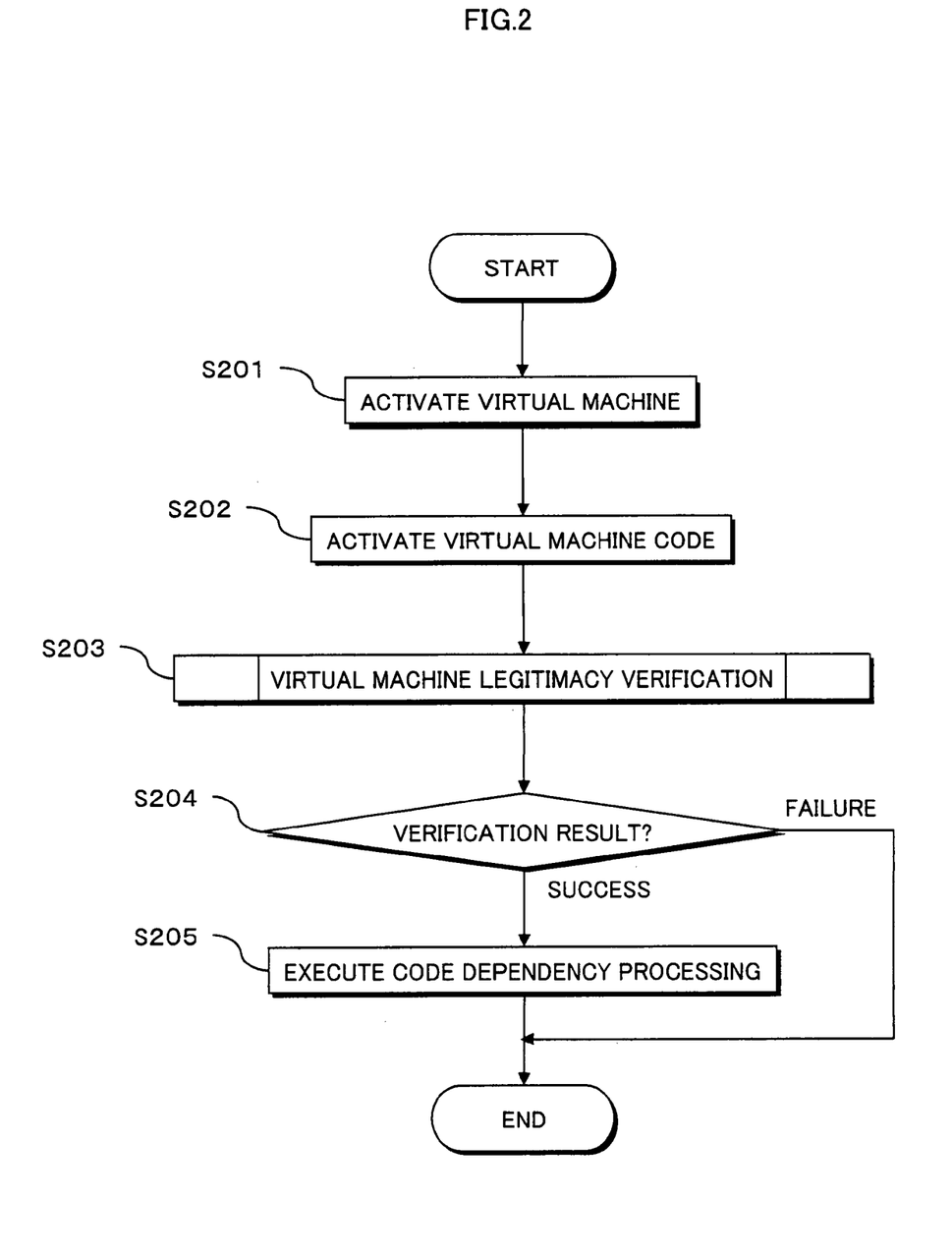
FIG. 2 is a flowchart of virtual machine code execution processing.

Next, execution of the virtual machine code in the information processing apparatus 101 is described with use of FIG. 2.

First, processing starts upon the information processing apparatus 101 receiving an instruction via the user operation reception unit 112 to execute the virtual machine code 121 on the recording medium 102.

Upon being instructed to execute the virtual machine code 121, the virtual machine execution unit 113 loads the virtual machine execution code 115 and the verification value table 116 from the information storage unit 114, and activates the virtual machine (S201).

Next, the virtual machine code 121 is read from the recording medium 102 via the disk reading unit 111, and the virtual machine execution unit 113 activates the virtual machine code 121 on the virtual machine (S202).

The virtual machine code 121 that has been activated on the virtual machine verifies the legitimacy of the execution environment that includes the virtual machine that is executing the virtual machine code 121, using the virtual machine verification module 1121 and the verification information storage module 1122 (S203). This processing is described in detail later.

The virtual machine code 121 ends its execution when the verification result at S203 is failure, since it is implemented so as to do so (S204).

When the verification result at S203 is success, the virtual machine code 121 executes code dependency processing defined in the code dependency processing module 1123 in the virtual machine code 121 (S205). Processing that is unique to the particular virtual machine code 121 is defined in the code dependency processing module 1123. For instance, the processing that the virtual machine code 121 performs is, but is not limited to being, content decryption processing that is copyright protection processing of content data of a movie or the like that is recorded separately on the recording medium 102.

Execution of the virtual machine code 121 ends with the end of the code dependency processing.

This completes the description of execution of the virtual machine code 121 in the information processing apparatus 101.

(Verification of Legitimacy of the Execution Environment that Includes the Virtual Machine)

The following describes processing for verifying legitimacy of the execution environment that includes the virtual machine. This processing is processing by which the virtual machine code 121 verifies whether or not the virtual machine that is executing the virtual machine code 121 is legitimate.

Since the interface and other information necessary to implement the virtual machine execution code 115 is publicly available, the virtual machine execution code 115 can be implemented by anyone. For this reason, there is a possibility that if the virtual machine execution code 115 is not legitimate, the virtual machine code 121 will perform illegitimate operations when executed, and the processing of the virtual machine code 121 will not be performed correctly. If the virtual machine code 121 is, for instance, a program for protecting copyright of content such as a movie that is recorded separately on the recording medium 102, the content will be played without authorization, and copyright thereof will not be able to be protected. Hence, processing for verifying the execution environment that includes the virtual machine is necessary.

The following describes the modules that compose the virtual machine code 121. The virtual machine verification module 1121 is a module that verifies whether or not the virtual machine that executes the virtual machine code 121 is legitimate. The verification information storage module 1122 is information for verifying the legitimacy of the execution environment that includes the virtual machine. Specifically, the virtual machine verification module 1121 obtains the verification value table identification information 117 and the verification value from the virtual machine, and verifies the legitimacy of the execution environment that includes the virtual machine according to whether the values match the verification information stored in the verification information storage module 1122. Accordingly, even if an emulator that copies data that includes a player model number, manufacturer name and so on is created in a different playback apparatus, and, for instance, a virtual machine and the emulator are mounted in a computer, playback by the illegitimate emulator can be prevented because the device unique values stored in the verification table 116 will be different. The verification processing is described in detail later.

The following describes the modules that compose the virtual machine execution code 115. The verification value obtaining module 1151 is a module that searches the verification value table 116 for a value that corresponds to the address designated by the virtual machine verification module 1121 in the virtual machine code 121, and obtains that value. The verification value conversion module 1152 is a module that converts, by performing a calculation, the value obtained from the verification value table 116. The virtual machine is characterized in that it has a state, and converts the value read from the verification value table 116 uniquely according to the state. Furthermore, after the conversion processing has ended, the state is updated to a value uniquely determined according to the order of the verification values that have been read up to the present. It is the state storage module 1153 that stores the state.

The virtual machine code execution module 1154 is a module that executes processing defined by the code dependency processing module 1123 in the virtual machine code 121 while converting it into native code that depends on the platform.

The verification value table 116 is data composed of addresses 401 and values 402, and is a table in which each value 402 is in correspondence with a unique address 401. Note that as long as the values 402 in the verification value table 116 can be uniquely specified, the addresses 401 may be either physical/logical addresses or real/virtual addresses. Furthermore, part of binary data stored in the information processing apparatus 101 for other purposes, such binary data of font files or firmware, may be also used as the verification value table 116.

Figure 3:
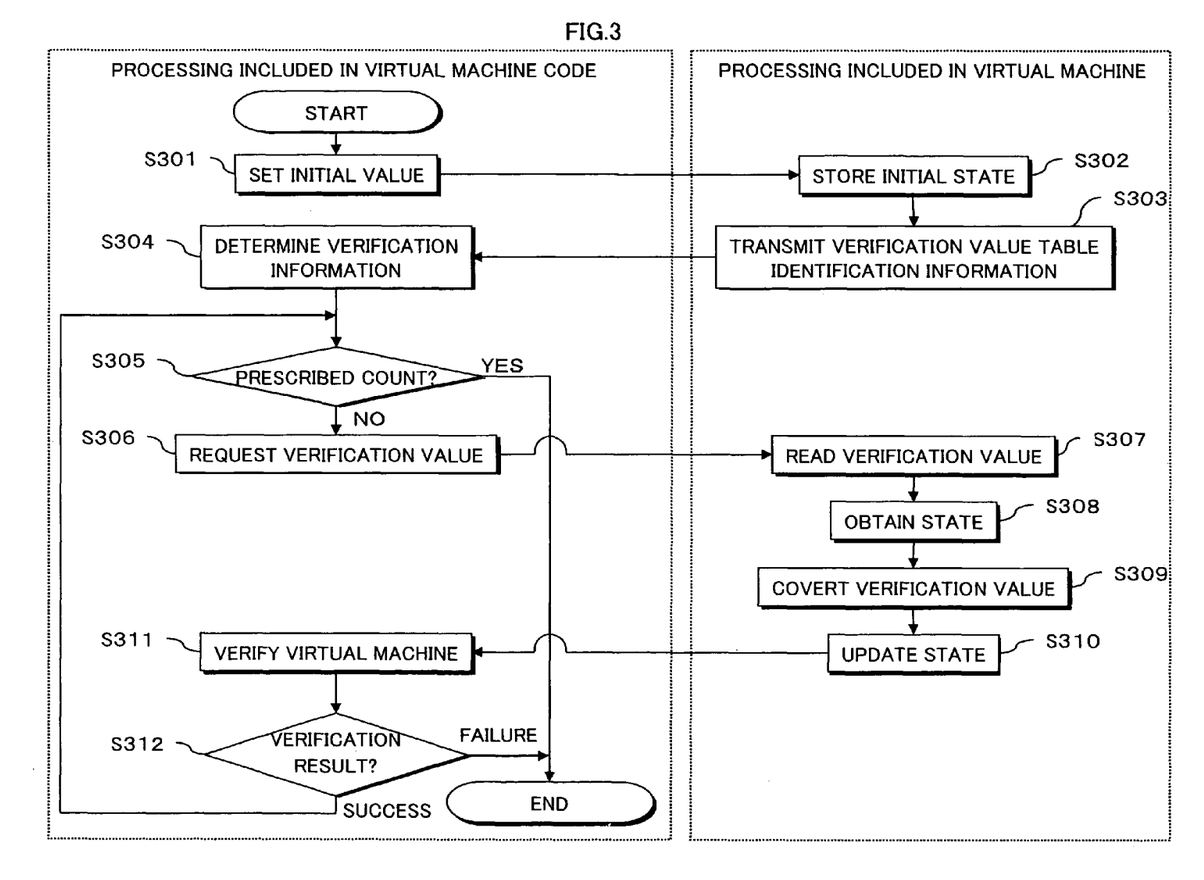
FIG. 3 is a flowchart of processing for verifying legitimacy of an execution environment that includes a virtual machine.

Next, the flow of the processing for verifying legitimacy of the execution environment that includes the virtual machine is described with use of FIG. 3.

First, the virtual machine code 121 assigns an initial value, 0x12 for instance, to the virtual machine (S301). Any other value that is a predetermined value may be used.

The virtual machine stores the assigned initial value in the state storage module 1153 (S302). The virtual machine then transmits the verification value table identification information 117 to the virtual machine code 121 (S303). Next, using the virtual machine verification module 1211, the virtual machine code 121 obtains the verification information that corresponds to the verification value table identification information 117 received as S303, from the verification information storage module 1122 (S304). Using the virtual machine verification module 1121, the virtual machine code 121 checks the verification count. The processing ends if the verification count reaches a prescribed number of times set in the virtual machine verification module 1121, and continues if the verification count has not reached the prescribed number of times (S305).

Figure 5:
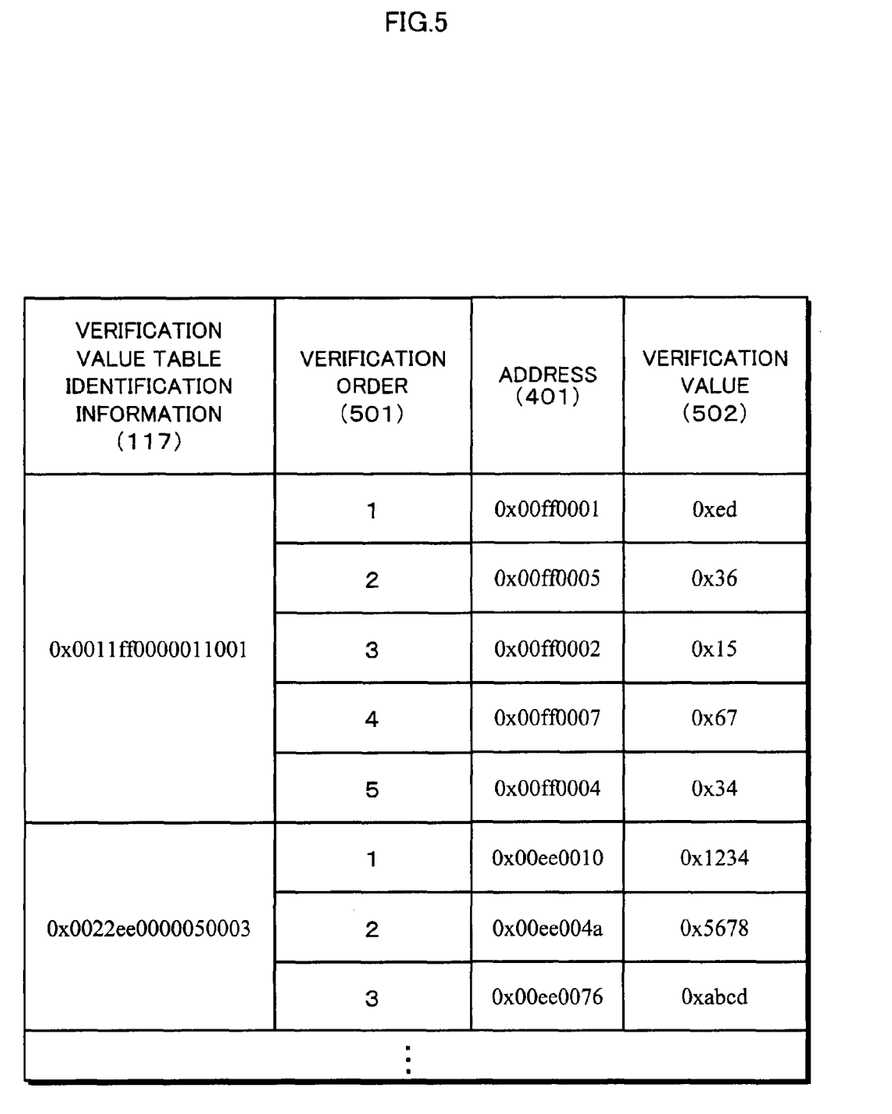
FIG. 5 is an example of the data structure of verification information in virtual machine code 121.

Next, the virtual machine verification module 1121 requests a verification value from the virtual machine, in accordance with the order defined in the verification information stored in the verification information storage module 1122 (S306). The data structure of the verification information stored by the verification information storage module 1122 is shown in FIG. 5. The verification information is composed of verification value table identification information 117, verification order 501, addresses 401, and verification values 502, and has verification information that corresponds to the verification value table 116 stored by each information processing apparatus 101. FIG. 5 shows that, for example, described in the verification value table identification information 117 is verification information 0x0011ff0000011001, verification information 0x0022ee0000050003, and other verification information. The virtual machine verification module 1121 refers to the record that matches the verification value table identification information 117 received at S303, and requests a verification value from the virtual machine using the addresses 401 in the order shown by the verification order 501. The virtual machine verification module 1121 verifies the legitimacy of the execution environment that includes the virtual machine by checking whether or not the value corresponding to the address returned by the virtual machine matches the verification value 502.

At step S306, the virtual machine verification module 1121 specifies an address 401 corresponding to the present verification count, in accordance with the verification information, and requests a verification value from the virtual machine. Specifically, in the case of the verification value table identification information 117 of FIG. 5 being the verification information of 0x0011ff0000011001, the virtual machine verification module 1121 requests the verification value by specifying the address 0x00ff0001 if the present verification count is 0, and the address 0x00ff0002 if the present verification count is 2.

Having received the request for a verification value, using the verification value obtaining module 1151, the virtual machine obtains the value corresponding to the designated address from the verification value table 116 (S307). For example, when receiving a request from the virtual machine verification module 1121 for the value corresponding to the address 0x00ff0001, the verification value obtaining module 1151 obtains the value 0xff that corresponds to the address 401, from the verification value table 116 in FIG. 4.

Next, the verification value conversion module 1152 in the virtual machine obtains the state from the state storage module 1153 (S308). For instance, in the case of the initial state, the verification value conversion module 1152 obtains the state 0x12 stored at S301 and S302.

Next, the verification value conversion module 1152 applies a calculation to the value obtained from the verification value table 116, thereby converting the value (S309). For instance, the verification value conversion module 1152 performs conversion by applying an XOR to the state obtained from the state storage module 1153 and the value obtained from the verification value table 116. Specifically, when the obtained state is 0x12 and the value read from the verification value table 116 is 0xff, the value is converted to 0xed.

Next, the verification value conversion module 1152 updates the state stored by the state storage module 1153 using the value used at S309 (S310). For instance, the verification value conversion module 1152 updates the state with a value obtained by applying an XOR calculation to the value of the least significant byte of the designated address and the value stored by the state storage module 1153.

Next, the virtual machine returns the verification value calculated at S309 to the virtual machine code 121 (S311). The virtual machine verification module 1121 in the virtual machine code checks whether the returned value matches the value in the verification information, and judges the verification result to be success if the two match, and failure if the two do not match (S312).

When the verification result is success, the virtual machine code 121 returns to S305, and implements the verification the prescribed number of times. When the verification result is failure, the virtual machine code 121 ends the processing.

This completes the description of the processing for verifying the legitimacy of the execution environment that includes the virtual machine.

Note that although the initial value set in the virtual machine at S301 of the present embodiment is stored in the virtual machine code 121, it is not limited to being so, and may be stored in the virtual machine execution code 115. In this case, instead of setting the initial value with respect to the virtual machine at S301, the virtual machine code 121 requests initialization therefrom. This request for initialization may be made by the state storage module 1153 reading an initial value to the virtual machine verification module 1121 during execution, or by the virtual machine verification module 1121 expressly instructing execution. A further alternative is to use a specific value in the verification value table 116 as the initial value.

Furthermore, at S309 of the present embodiment, the conversion calculation of the verification value is performed using an XOR of the state obtained from the state storage module 1153 and the value corresponding to the designated address, but is not limited to being so. Any other calculation that enables a unique value to be calculated using the state obtained from the state storage module 1153 and the value read from the verification value table 116 may be used, examples of which are a one-way function such as SHA, and an encryption function such as AES.

Furthermore, although the virtual machine returns the requested verification value to the virtual machine code 121 after converting it at S309 in the present embodiment, the virtual machine may instead return the value from the verification value table 116 without converting it. In this case, the verification value conversion module 1152 and the state storage module 1153 in FIG. 1 and the steps S301, S302, S308, S309, and S310 in FIG. 3 are unnecessary.

Furthermore, the method used to calculate the updated value in the state updating at S310 of the present embodiment is an XOR of the value of the least significant byte of the designated address and the value stored by the state storage module 1153, but it is not limited to being so. Any method may be used that enables calculation of different values corresponding to the order in which the verification values are called, and that is repeatable. By using a state calculated in this way in the conversion of the verification value, even if a verification value is requested with the same address from the point of view of the virtual machine code 121, a different value will be returned if the request order is different. Therefore, even if the verification value table 116 is exposed, for example, the verification by the virtual machine code 121 cannot be passed if the conversion calculation at S309 is not exposed. This has an advantage of an increased security level.

Note that although in the present embodiment it is assumed that the verification value check is performed a prescribed plural number of times at S305, the number of verification value checks may be prescribed as one with respect to any apparatus. In such a case the processing at S305 and S312 may be omitted. Furthermore, in such a case, a plurality of verification values may be provided in the verification information corresponding to each one verification value table 116, and, at the time of verification, one of these is selected at random and the verification value requested from the virtual machine. In this way, requesting the verification value at random in a case in which the verification value is to be checked only once enables a malicious attack where an illegitimate virtual machine returns an exposed fixed value to be dealt with if the value of the specific address of the verification table 116 is exposed.

Furthermore, in the present embodiment, although the verification value conversion module 1152 is included in the virtual machine execution code 115, the present invention is not limited to this structure. The verification value conversion module 1152 may be stored individually from the virtual machine execution code 115.

Furthermore, in the present embodiment, the length of the data of the verification value is not limited to being one byte.

Modification Examples

The present invention has been described based on, but is not limited to, the above embodiment. Cases such as the following are included in the present invention.

(1) Each described apparatus is, specifically, a computer system composed of a microprocessor, a ROM, a RAM, a hard disk unit, a display unit, a keyboard, a mouse, and the like. Computer programs are stored in the RAM or the hard disk unit. The information processing apparatus achieves its functions by the microprocessor operating according to the computer programs. Each computer program is composed of a plurality of command codes that show instructions with respects to the computer, for achieving predetermined functions.

(2) All or part of the compositional elements of each apparatus may be composed from one system LSI (Large Scale Integration). The system LSI is a super-multifunctional LSI on which a plurality of compositional units are manufactured integrated on one chip, and is specifically a computer system that includes a microprocessor, a ROM, a RAM, or the like. Computer programs are stored in the RAM. The LSI achieves its functions by the microprocessor operating according to the computer programs.

(3) Part or all of the compositional elements of each apparatus may be composed of a removable IC card or a single module. The IC card or the module is a computer system composed of a microprocessor, a ROM, a RAM, or the like. The IC card or the module may be included the aforementioned super-multifunctional LSI. The IC card or the module may achieve its functions by the microprocessor operating according to computer programs. The IC card or the module may be tamper-resistant.

(4) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM, and MO, a DVD, a DVD-ROM, a DVD-RAM, a BD (Blu-ray Disc) or a semiconductor memory, that stores the computer program or the digital signal. Furthermore, the present invention may be the computer program or the digital signal recorded in any of the aforementioned recording medium apparatuses.

Furthermore, the present invention may be the computer program or the digital signal transmitted on an electric communication network, a wireless or wired communication network, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(5) The present invention is a verification method used in an information processing apparatus that executes processing relating to playback of contents by using a virtual machine included therein, the verification method comprising: a reading step of reading a verification program recorded on a recording medium together with the contents; and a verification step of verifying, by using the virtual machine executing the verification program, legitimacy of the information processing apparatus including the virtual machine.

Here, the "reading step" is included in the processing of Step S202 explained in the embodiment. Also, the "verification step" corresponds to processing of Step S203 (see FIG. 2) explained in the embodiment.

(6) Furthermore, the present invention may be the verification method described in the modification example (5), wherein in the verification step, certification information that varies depending on timing is used for the verification.

Here, the "certification information" is described in the embodiment as a value generated in Step S309 in FIG. 3.

(7) In the modification example (6), the verification step may include a requesting step of making a request for the certification information that is based on secret information stored in the information processing apparatus, a comparing step of comparing the certification information with verification information recorded on the recording medium, and a judging step of judging whether the information processing apparatus is legitimate based on a result of the comparison, and the verification method may further comprise a providing step of generating the certification information by using the virtual machine on reception of the request, and providing the verification program with the generated certification information.

The "requesting step" corresponds to Step S306 explained in the aforementioned embodiment (see FIG. 3), the "comparing step" and the "judging step" correspond to Step S312 explained in the aforementioned embodiment (see FIG. 3). The providing step corresponds to Steps S307 to S311. The "secret information" corresponds to a value included in the verification value table 116, and the "verification information" corresponds to a verification value shown in FIG. 5.

(8) In the modification example (7), the judging step may include a repeating step of repeating the comparing step every time the certification information depending on timing varies, and a concluding step of concluding that the information processing apparatus is illegitimate if comparisons of the comparing step repeated by the repeating step have resulted in failure a prescribed number of times in succession.

Here, the "repeating step" corresponds to "SUCCESS" of Step S312 explained in the aforementioned embodiment (see FIG. 3). The "concluding step" corresponds to Step S305 and "FAILURE" of Step S312.

(9) In the modification example (7), the providing step may include an update step of changing calculation information used for generating the certification information, based on a value specific to a reading order of the secret information.

Here, the "update step" and the "output step" respectively correspond to Step S310 and Step S311 explained in the aforementioned embodiment. The "calculation information" corresponds to the state explained in the embodiment.

(10) In the modification example (6), the recording medium may have recorded thereon a plurality of verification candidate information sets, the information processing apparatus may store therein one or more secret information sets, the verification step may include a selection step of selecting one of the verification candidate information sets as verification information, a requesting step of making a request for the certification information generated based on one of the secret information sets corresponding to the verification information, a comparing step of comparing the certification information with the verification information, and a judging step of judging whether the information processing apparatus is legitimate based on a result of the comparison, and the verification method may further comprise a providing step of generating, on reception of the request, by using the virtual machine, the certification information based on the secret information set corresponding to the verification information, and providing the verification program with the generated certification information.

Here, the "selection step", the "request step" and the "comparison step" respectively correspond to Step S304, Step S306 and Step S312 (see FIG. 3). The judging step includes processing of Steps S312 and S305. The "providing step" corresponds to Steps S307 to S311. The "verification candidate information set" corresponds to the verification value 502 shown in FIG. 5 and FIG. 6. The "verification information set" corresponds to one of the verification values 502 selected at Step S306 in accordance with the verification order 501.

(11) In the modification example (10), the judging step may include a repeating step of repeating the selection step, the requesting step and the comparing step if the certification information and the verification information are judged as being identical in the comparing step, and a concluding step of concluding that the information processing apparatus is legitimate if comparisons of the comparing step repeated by the repeating step have resulted in success a prescribed number of times in succession, and concluding that the information processing apparatus is illegitimate in the other cases.

Here, the "repeating step" corresponds to "SUCCESS" of Step S312 in the first embodiment. The "concluding step" corresponds to "FAILURE" of Step S312 and Step S305.

(12) In the modification example (11), in the repeated verification steps, verification candidate information set among the verification information sets that is to be selected as verification information in the selection step of every repetition of the verification step may be different according to the number of repetitions of the verification step, and in the providing step, the certification information to be generated may vary according to the number of repetitions of the verification step. Also in the modification example (11), one or more of the verification candidate information sets may correspond to an identifier uniquely identifying the virtual machine, and in the selection step, one of the one or more of the verification candidate information sets corresponding to the identifier may be selected as the verification information.

(13) In the modification example (10), in the selection step, one of the verification candidate information sets may be randomly selected, and in the comparing step, the comparison may be performed using the certification information that randomly varies and is in correspondence with the one of the verification candidate information sets. Also in the modification example (10), one or more of the verification candidate information sets may correspond to an identifier uniquely identifying the virtual machine, and in the selection step, one of the one or more of the verification candidate information sets corresponding to the identifier may be selected as the verification information.

Here, the "identifier" corresponds to the verification value table identification information 117 explained in the aforementioned embodiment.

(14) In the modification example (5), the recording medium may have recorded thereon a playback-related program that is executed on the virtual machine and includes processing procedure relating to playback of the contents, and the verification method may further comprise a restraining step of restraining execution of the processing procedure relating to playback of the contents if the information processing apparatus is judged as illegitimate in the verification step. Also in the modification example (5), the contents may be generated by encrypting digital copyrighted works, and the processing procedure relating to playback of the contents may include a procedure for decrypting the contents.

Here, the "restraining step" corresponding to "FAILURE" of S204 (see FIG. 2) explained in the embodiment above.

(15) The present invention also is an information processing apparatus that includes a virtual machine and executes processing relating playback of contents recorded on a recording medium, wherein the recording medium has recorded thereon a verification program to be executed on the virtual machine for verifying legitimacy of the information processing apparatus, and the information processing apparatus comprises: a storing unit that stores one or more secret information sets unique to the information processing apparatus; a reading unit operable to read the verification program; a reception unit operable to receive, from the verification program, a request for certification information that varies depending on timing and is generated based on one of the secret information sets corresponding to verification information used for the verification; and a providing unit operable to generate the certification information using the one of the secret information sets corresponding to the verification information on reception of the request, and provide the verification program with the generated certification information.

The present invention also is a An integrated circuit installed in an information processing apparatus that includes a virtual machine and executes processing relating playback of contents recorded on a recording medium, wherein the recording medium has recorded thereon a verification program to be executed on the virtual machine for verifying legitimacy of the information processing apparatus, and the integrated circuit comprises: a storing unit that stores one or more secret information sets unique to the information processing apparatus; a reading unit operable to read the verification program; a reception unit operable to receive, from the verification program, a request for certification information that varies depending on timing and is generated based on one of the secret information sets corresponding to verification information used for the verification; and a providing unit operable to generate the certification information using the one of the secret information sets corresponding to the verification information on reception of the request, and provide the verification program with the generated certification information.

The present invention also is a recording medium having recorded thereon a verification program for verifying legitimacy of an information processing apparatus that includes a virtual machine and executes processing relating playback of contents, wherein the recording medium has recorded thereon one or more verification candidate information sets used for the verification, together with the verification program, and the verification program comprises: a selection step of selecting one of the verification candidate information sets as verification information; a requesting step of making a request for certification information that varies depending on timing and is based on secret information corresponding to the verification information to the virtual machine; a comparing step of acquiring the certification information and comparing the certification information with verification information recorded on the recording medium; and a judging step of judging whether the information processing apparatus is legitimate based on a result of the comparison.

The present invention also is a verification system structured with an information processing apparatus that includes a virtual machine and executes processing relating to playback of contents, and a recording medium having recorded thereon a verification program for verifying legitimacy of the information processing apparatus, wherein the recording medium has recorded thereon one or more verification candidate information sets used for the verification, together with the verification program, the verification program comprises: a selection step of selecting one of the verification candidate information sets as verification information; a requesting step of making a request for certification information that varies depending on timing and is based on secret information corresponding to the verification information to the virtual machine; a comparing step of acquiring the certification information and comparing the certification information with verification information recorded on the recording medium; and a judging step of judging whether the information processing apparatus is legitimate based on a result of the comparison, and the information processing apparatus comprises: a storing unit that stores one or more secret information sets unique to the information processing apparatus; a reading unit operable to read the verification program; a reception unit operable to receive the request; and a providing unit operable to generate the certification information using the one of the secret information sets corresponding to the verification information on reception of the request, provide the verification program with the generated certification information.

Figure 6:
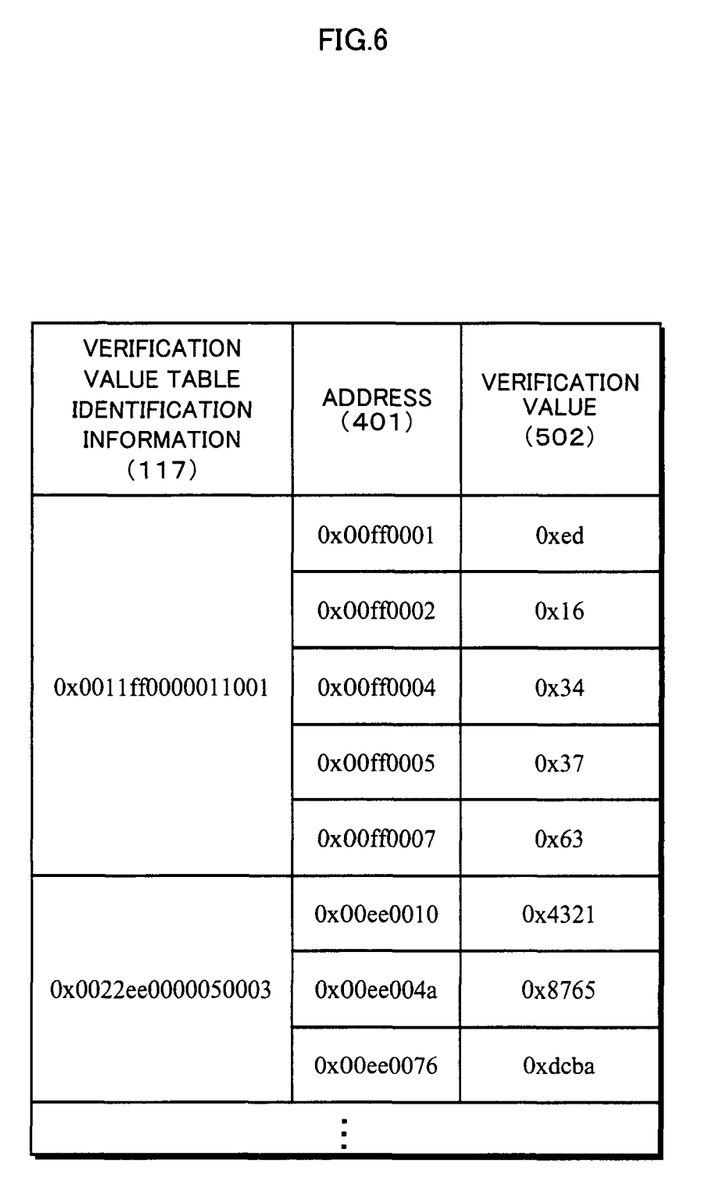
FIG. 6 is another example of the data structure of verification information in the virtual machine code 121.

Here, the "verification program" corresponds to virtual machine verification module 1121 shown in FIG. 1, and the "verification candidate information" corresponds to the verification value 502 shown in FIG. 5 and FIG. 6.

The "selection step", the "requesting step" and the "comparing step" included in the "verification program" of this modification example respectively correspond to Steps S304, S306 and S312 (see FIG. 3) of the embodiment above. The "judging step" includes Steps S312 and S305.

The "storing unit" included in the "information processing apparatus" corresponds to the information storage unit 114. The "reading unit" corresponds to the disk reading unit 111. The "reception unit" and "the providing unit" are realized by the virtual machine execution unit 113 reading the instruction codes included in the virtual machine execution code 115, analyzing the instruction codes and executing the instruction codes. The "secret information" corresponds to the value 402 explained with reference to FIG. 4, and the "certification information" is a value generated at Step S309.

(16) The present invention also is a verification program for verifying legitimacy of an information processing apparatus that includes a virtual machine and executes processing relating playback of contents, the verification program comprising: a selection step of selecting one of verification candidate information sets as verification information; a requesting step of making a request for certification information that varies depending on timing and is based on secret information corresponding to the verification information to the virtual machine; a comparing step of acquiring the certification information and comparing the certification information with the verification information recorded on the recording medium; and a judging step of judging whether the information processing apparatus is legitimate based on a result of the comparison.

Here, the "verification program" corresponds to virtual machine verification module 1121 shown in FIG. 1, and the "verification candidate information" corresponds to the verification value 502 shown in FIG. 5 and FIG. 6. The "selection step", the "requesting step" and the "comparing step" included in the "verification program" of this modification example respectively correspond to Steps S304, S306 and S312 (see FIG. 3) of the embodiment above. The "judging step" includes Steps S312 and S305. The "secret information" corresponds to the value 402 explained with reference to FIG. 4, and the "certification information" is a value generated at Step S309.

(17) The present invention also is a certification program used in an information processing apparatus that includes a virtual machine and executes processing relating to playback of contents recorded on a recording medium, wherein the recording medium has recorded thereon a verification program to be executed on the virtual machine for verifying legitimacy of the information processing apparatus, the information processing apparatus comprises a storing unit that stores one or more secret information sets unique to the information processing apparatus, and the certification program comprises: a reception step of receiving, from the verification program, a request for certification information that varies depending on timing and is generated based on one of the secret information sets corresponding to verification information used for the verification; and a providing step of generating the certification information using the one of the secret information sets corresponding to the verification information on reception of the request, and providing the verification program with the generated certification information.

Here, the "verification program" and the "certification program" respectively correspond to the virtual machine verification module 1121 and the virtual machine execution code 115 explained in the embodiment.

The "reception step" included in the "certification program" is included in Step S307 explained in the embodiment, and the "providing step" corresponds to Steps S307 to S311.

(18) The present invention may have the following structure.

(18-1) The present invention may be an information processing method for executing a virtual machine code using a virtual machine, comprising: a step performed by the virtual machine code for verifying legitimacy of an execution environment including the virtual machine; and a step of stopping processing of the virtual machine code if the execution environment including the virtual machine is judged as illegitimate.

(18-2) The present invention may be the information processing method of the modification example (18-1), wherein the verification step further includes a step of making a request for a specific value that is based on secret information stored in the virtual machine, a step performed by the virtual machine of providing the virtual machine code with the specific value and a step of comparing the specific value with the verification information stored in the virtual machine code for verifying the legitimacy based on whether the specific value and the verification information are the same.

(18-3) The information processing method of the modification example (18-2) may further include a step of repeating the verification step a plurality of times.

(18-4) In the information processing method of the modification example (18-2), the step performed by the virtual machine of providing the virtual machine code with the specific value may include a step performed by the virtual machine of converting the specific value to an uniquely determined value based on a reading order of the specific value.

(18-5) The present invention may be a computer program that has a computer execute the steps included in the information processing method of any of the modification examples (18-1) to (18-4).

(18-6) The present invention may be a computer-readable recording medium having recorded thereon a computer program that has a computer execute the steps included in the information processing method of any of the modification examples (18-1) to (18-4).

(19) The present invention may be any combination of the above-described embodiment and modifications.

INDUSTRIAL APPLICABILITY

The information processing apparatus of the present invention, which uses a virtual machine to execute programs without depending on a platform, is effective in cases that demand security in programs that operate on the virtual machine, such as a program for copyright protection.

The invention claimed is:

1. A verification method used in an information processing apparatus having a virtual machine that executes processing relating to playback of contents, wherein the information processing apparatus holds therein a verification value table storing a value that dynamically changes while the information processing apparatus is executing processing, the value being dynamically changed so that the value corresponds to a predetermined address at predetermined time points, the verification method comprising:

a reading step of reading a verification program recorded on a recording medium together with the contents;

an execution step in which the virtual machine executes the verification program;

a requesting step in which the verification program designates, at each predetermined time point, the predetermined address used for verification to be performed at the predetermined time point, and requests the virtual machine to acquire a value held at the predetermined address;

an acquiring step in which the virtual machine, in response to the request, acquires the value held at the predetermined address designated by the verification program from the verification value table;

a providing step in which the virtual machine provides the verification program with the value acquired in the acquiring step; and a verification step in which the verification program verifies whether the value provided in the providing step is a valid value that is to be provided when an execution environment including the virtual machine is valid, and determines that the execution environment including the virtual machine is invalid when the value is invalid.

2. The verification method of claim 1, wherein the information processing apparatus is a plurality of information processing apparatuses, and each information processing apparatus holds therein the verification value table, wherein the verification program holds a plurality of valid values corresponding to the verification value tables respectively, and wherein, in the verification step, the verification program verifies whether the value provided in the providing step matches one of the valid values that corresponds to one of the verification value tables that is held by the information processing apparatus that is executing the verification program, and determines that the execution environment including the virtual machine is invalid when the value does not match the one of the valid values.

3. An information processing apparatus having a virtual machine that executes processing relating to playback of contents recorded on a recording medium, wherein the recording medium stores thereon a verification program that is to be executed on the virtual machine so as to verify validity of an execution environment including the virtual machine, the information processing apparatus comprising:

a processor device;

a holding unit configured to hold therein a verification value table storing a value that dynamically changes while the information processing apparatus is executing processing, the value being dynamically changed so that the value corresponds to a predetermined address at predetermined time points;

a reading unit configured to read the verification program;

a virtual machine execution unit configured to, using the processor device, cause the virtual machine to execute the verification program;

a receiving unit configured to receive, from the verification program being executed by the virtual machine, a request issued to the virtual machine to acquire a value held at the predetermined address at each predetermined time point, the predetermined address being designated by the verification program at each predetermined time point and used for verification to be performed at the predetermined time point;

an acquiring unit configured to acquire the value held at the predetermined address designated by the verification program from the verification value table by using the virtual machine in response to the request;

a providing unit configured to provide the verification program with the acquired value by using the virtual machine in response to the request; and a verification unit configured to verify, by using the virtual machine, whether the value provided by the providing unit is a valid value that is to be provided when the execution environment including the virtual machine is valid, and to determine that the execution environment including the virtual machine is invalid when the value is invalid.

4. An integrated circuit mounted on an information processing apparatus having a virtual machine that executes processing relating to playback of contents recorded on a recording medium, wherein the recording medium stores thereon a verification program that is to be executed on the virtual machine so as to verify validity of an execution environment including the virtual machine, the integrated circuit comprising:

a holding unit configured to hold therein a verification value table storing a value that dynamically changes while the information processing apparatus is executing processing, the value being dynamically changed so that the value corresponds to a predetermined address at predetermined time points;

a reading unit configured to read the verification program;

a virtual machine execution unit configured to cause the virtual machine to execute the verification program;

a receiving unit configured to receive, from the verification program being executed by the virtual machine, a request issued to the virtual machine to acquire a value held at the predetermined address at the predetermined time point, the predetermined address being designated by the verification program at each predetermined time point and used for verification to be performed at the predetermined time point;

an acquiring unit configured to acquire the value held at the predetermined address designated by the verification program from the verification value table by using the virtual machine in response to the request;

a providing unit configured to provide the verification program with the acquired value by using the virtual machine; and a verification unit configured to verify, by using the virtual machine, whether the value provided by the providing unit is a valid value that is to be provided when the execution environment including the virtual machine is valid, and to determine that the execution environment including the virtual machine is invalid when the value is invalid.

5. A verification system comprising: an information processing apparatus having a virtual machine that executes processing relating to playback of contents; and a recording medium storing thereon i) a verification program that is to be executed on the virtual machine so as to verify validity of an execution environment including the virtual machine, and ii) the contents, wherein the information processing apparatus includes:

a processor device;

a holding unit configured to hold therein a verification value table storing a value that dynamically changes while the information processing apparatus is executing processing, the value being dynamically changed such that the value corresponds to a predetermined address at predetermined time points;

a reading unit configured to read the verification program;

a virtual machine execution unit configured to, using the processor device cause the virtual machine to execute the verification program;

a receiving unit configured to receive, from the verification program being executed by the virtual machine, a request issued to the virtual machine to acquire a value held at the predetermined address at each predetermined time point, the predetermined address being designated by the verification program at each predetermined time point and used for verification to be performed at the predetermined time point;

an acquiring unit configured to acquire the value held at the predetermined address designated by the verification program from the verification value table by using the virtual machine in response to the request;

a providing unit configured to provide the verification program with the acquired value by using the virtual machine; and a verification unit configured to verify, by using the virtual machine, whether the value provided by the providing unit is a valid value that is to be provided when the execution environment including the virtual machine is valid, and to determine that the execution environment including the virtual machine is invalid when the value is invalid.

6. A non-transitory computer readable recording medium having stored thereon a verification program used for verifying validity of an information processing apparatus having a virtual machine that executes processing relating to playback of contents, wherein the information processing apparatus includes: i) a holding unit configured to hold therein a verification value table storing a value that dynamically changes while the information processing apparatus is executing processing, the value being dynamically changed so that the value corresponds to a predetermined address at predetermined time points; and ii) a reading unit configured to read the verification program, and wherein, when executed, the verification program causes the information processing apparatus to perform a method comprising:

a requesting step of designating, at each predetermined time point, the predetermined address used for verification to be performed at the predetermined time point, and requesting the virtual machine to acquire a value held at the predetermined address;

a provision receiving step of receiving the value held at the predetermined address designated by the verification program from the virtual machine, the virtual machine acquiring the value held at the predetermined address at each predetermined time point from the verification value table in response to the request; and a verification step of verifying whether the value provided in the provision receiving step is a valid value that is to be provided when an execution environment including the virtual machine is valid, and determining that the execution environment including the virtual machine is invalid when the value is invalid.

7. A non-transitory computer readable recording medium having stored thereon a certification program used in an information processing apparatus having a virtual machine that executes processing relating to playback of contents recorded on a recording medium, wherein the recording medium stores thereon a verification program that is to be executed on the virtual machine so as to verify validity of an execution environment including the virtual machine, wherein the information processing apparatus includes:

a holding unit configured to hold therein a verification value table storing a value that dynamically changes while the information processing apparatus is executing processing, the value being dynamically changed so that the value corresponds to a predetermined address at predetermined time points, and wherein, when executed, the certificate program causes the information processing apparatus to perform a method comprising:

a reading step of reading the verification program;

an execution step in which the virtual machine executes the verification program;

a receiving step in which the verification program designates, at each predetermined time point, the predetermined address used for verification to be performed at the predetermined time point, and requests the virtual machine to acquire a value held at the predetermined address;

an acquiring step in which the virtual machine, in response to the request, acquires the value held at the predetermined address designated by the verification program from the verification value table;

a providing step in which the virtual machine provides the verification program with the acquired value; and a verification step in which the verification program being executed on the virtual machine verifies whether the value provided in the providing step is a valid value that is to be provided when the execution environment including the virtual machine is valid, and determines that the execution environment including the virtual machine is invalid when the value is invalid.

* * * * *